United States Patent Office 3,574,634
Patented Apr. 13, 1971

3,574,634
LOW CALORIE FOODSTUFFS
Richard L. Singer, New York, N.Y., assignor to
Calogics, Inc., New York, N.Y.
No Drawing. Continuation-in-part of application Ser. No. 737,381, June 17, 1968. This application June 2, 1969, Ser. No. 829,719
Int. Cl. A21d 13/06, 13/04; A23l 1/10
U.S. Cl. 99—83                                    17 Claims

ABSTRACT OF THE DISCLOSURE

Low-calorie synthetic foodstuffs, namely doughs containing less than about 10 or 15 percent by weight of assimilable carbohydrate and consisting essentially of vital gluten, a non-nutritive edible filler, a vegetable gum, and water; dry mixes from which said doughs can be prepared by the addition of liquid; cooked and uncooked pasta products and leavened and unleavened baked goods, such as bread, breakfast cereals, and the like, prepared from said doughs.

---

This application is a continuation-in-part of application Ser. No. 737,381 filed June 17, 1968, and now abandoned.

The present invention relates to calorie-poor synthetic foodstuffs poor in assimilable carbohydrate and to methods of making the same. More in particular, the present invention relates to calorie-poor leavened and unleavened doughs poor in assimilable carbohydrate, to dry mixes from which said doughs can be prepared by the addition of liquid, to uncooked pasta products prepared from said doughs, to products prepared from said doughs by cooking or baking, and to methods of making such doughs and other products.

It has long been desired in the art to reduce the caloric and/or carbohydrate content of farinaceous products, including leavened and unleavened products such as bread, rolls, cakes, crackers, breakfast foods, cocktail snacks, pasta products such as macaroni, spaghetti, noodles, and the like. In the past, this has been accomplished to a greater or lesser degree by increasing the water content of the products, by decreasing their fat content, by diluting them with non-nutritive solids, and/or by substituting proteins for the assimilable carbohydrates therein.

However, the reduction in caloric and/or assimilable carbohydrate content which can be effected by introducing more water into farinaceous products, or by decreasing or eliminating their fat content altogether, is limited.

Also, heretofore in the art it has not been possible to dilute farinaceous products extensively with non-nutritive solids to reduce their assimilable carbohydrate content without a concomitant loss of the desirable properties characteristic of the products.

Finally, the substitution of proteins for assimilable carbohydrates, for example in products like the commercially available protein breads, does not significantly reduce the caloric content of the products because proteins and assimilable carbohydrates each contain about the same number of calories per gram. This substitution effects only a limited reduction of carbohydrate content before the character of the product changes. For example, the partial substitution of gluten flour for ordinary flour in prior art farinaceous products is not successful in reducing their carbohydrate content by more than from about 60 percent to about 40 percent, with no significant reduction in calories. With higher gluten contents, rubbery doughs are formed which are "bucky," i.e. are difficult to work and develop.

The highly tenacious protein bonding (probably attributable to the presence of sulfhydryl groups and disulfide linkages) observable in such doughs of high gluten content is modified in ordinary farinaceous materials by the presence therein of the starches (assimilable carbohydrate), naturally found in flours. This permits the development, in ordinary baked bread for example, of a more open crumb, forming a network to which the pleasing texture of the bread is largely attributable.

In the synthetic products of the present invention, the crumb structure and texture characteristics resulting from the use of conventional flours are simulated by vital gluten, poor in starch or free of starch, in combination with a non-nutritive edible filler and with an edible vegetable gum which appears to serve to bind the filler to the gluten protein. The presence of the non-nutritive filler and binder makes the otherwise dense, rubbery doughs workable and convertible by heating (e.g. boiling, steaming, baking) into palatable products poor in, or free of, assimilable carbohydrate and of reduced caloric content. In particular, the doughs of the present invention when leavened and baked produce synthetic bakery products such as bread and rolls which in their taste and texture closely resemble products prepared with conventional flours.

Doughs, pasta, and cooked and/or baked products of the type discussed above have been prepared according to the present invention to contain up to only about 10 to 15 percent by weight of starch, usually from about 1 percent to about 10 to 15 percent by weight of starch. Products other than pasta, in particular, can be prepared to contain up to about only 10 percent by weight of starch, i.e. from about 1 percent to about 10 percent of starch. Because the products of the present invention do not involve a mere substitution of starch by protein of equal caloric content, they are products significantly reduced in caloric content as well as in carbohydrate content. The caloric content of a typical synthetic bread according to the invention is no more than about 1.2 calories per gram as baked. The least palatable commercial diet breads now available contain about 2 calories per gram as baked. Conventional bread contains about 2.6 calories per gram as baked.

The doughs of the present invention should contain "vital" gluten, i.e. gluten proteins which have not been denatured by the processes used to separate starch from the gluten. The doughs may be either substantially free of assimilable carbohydrate (starch) or may contain up to at most about 10 to 15 percent by weight of starch.

Doughs containing vital gluten and a low starch content are most conveniently prepared from commercially available vital gluten wheat flours. These flours are generally prepared by extracting starch from ordinary flours with water or other solvents and then drying the gluten residues without excessive heating which would tend to denature the gluten protein. A typical commercially available vital gluten wheat flour has the following approximate analysis:

| | Percent |
|---|---|
| Moisture | 9.6 |
| Protein | 38.7 |
| Ash | 0.7 |
| Fat (acid hydrolysis) | 4.2 |
| Carbohydrates | 46.8 |

A vital gluten wheat flour of still greater gluten content is commercially available under the trade name "Vicrum" and has the following approximate analysis:

| | Percent |
|---|---|
| Moisture | 6 |
| Protein | 71 |
| Ash | 1.2 |
| Fat (acid hydrolysis) | 6.5 |
| Carbohydrate (defined as composed of N-free extract and fiber) | 15.3 |

The material is a light tan free-flowing powder 97 percent of which passes a standard 60-mesh screen.

Although this material, or equivalent gluten flours from other sources, may be used directly in preparaing the doughs of the prevent invention, additional starch can be removed therefrom by washing, leaching, or treatment with diastatic enzymes. The desirability of such additional treatments depends, among other things, on their cost, and must be balanced against the desire or need for a product totally free of assimilable carbohydrate. If an untreated substantially starch-free gluten flour like the "Vicrum" product described above is used, the content of assimilable carbohydrate derived therefrom and present in a typical finished baked product according to the present invention is usually less than about four percent by weight after dilution with other ingredients. Lower carbohydrate contents will result in leavened doughs because of carbohydrate removal by fermentational.

Doughs containing vital gluten and less than 10 or 15 percent by weight of starch can be prepared from ordinary flour by repeatedly leaching such flour with water to remove starch prior to combination with the other ingredients characteristically present in the doughs of the invention. Alternatively, the starch content of doughs prepared from ordinary flour or gluten flour having a substantial percentage of residual starch can be reduced by treatment of the dough with diastatic enzymes and by repeated leavening with yeast, thus to convert the starch to sugar and ultimately to alcohol and carbon dioxide.

The utilization of leaching, enzymatic, and leavening processes to provide vital gluten doughs of low starch content from conventional flours as starting materials is of little commercial importance because of the time which these processes consume and their cost. In practice, in preparing the doughs of the invention, it is much preferred to use commercially available vital gluten flours from which starch has been extensively removed.

Cellulosic materials are preferred as the non-nutritive edible filler incorporated into the products of the present invention. These materials include vegetable matter derived from spinach, squash, cabbage, kale, beets, rhubarb, corncobs, cucumber, melon rind, straw, peanut shells, wood pulp, and the like. Non-nutritive edible fillers particularly suitable in the present invention are cellulose crystallite aggregates like those described in U.S. Pat. 3,023,104, and wheat middlings (hereinafter referred to as "bran"), particularly middlings from which assimilable carbohydrate has been removed. Cellulose crystallite aggregates are conveniently available commercially, for example under the trade name "Avicel". The starch content of the bran fillers may be reduced or removed by simple grinding, which liberates starchy particles adhering to the middlings, followed by sifting. Starch may also be removed by washing the middlings with water or with weak alkali, with or without prior grinding, or by treatment with diastatic enzymes.

A variety of vegetable gums can be employed as binders in the compositions of the present invention. These material include gum karaya, psyllium husk, tragacanth, guar, pectin, and locust bean gum. Other gums including algin and acacia can be employed but are less suitable as tending to inhibit the rise of leavened doughs. In general, the best gums are those that are highly retentive of water, but not necessarily those which absorb the most water.

The presence of cellulose and gums in baker products of the invention such as breads makes the products materially more absorptive of water than conventional breads. This in turn promotes a feeling of satiation caused by increased bulking in the stomach after the ingestion of only modest quantities of the product. This aids the dieter in restricting his good intake.

The doughs of the invention fall within the following composition range:

| | Parts by wt. |
|---|---|
| Flour component | 50 |
| Inert filler | 10–50 |
| Vegetable gum | 1–10 |
| Water | 50–100 |

(In the doughs having a content of starch less than about 10 percent, the protein: starch ratio in the flour component should be at least 2:1.)

These ingredients alone are sufficient for the manufacture of pasta products such as spaghetti and macaroni, or for the manufacture of unleavened baked goods such as cocktail snacks, breakfast foods in flake or particle form, and the like. For the production of leavened products, baker's yeast and yeast nutrients are added to the dough. In general, an amount of yeast conventional for ordinary farinaceous products is used in the synthetic foodstuffs of the present invention, i.e. the minimum amount sufficient to give the desired degree of rise within an economically feasible time period. There is no theoretical upper limit on the amount of yeast which can be employed because it is killed during the baking process. In practice, the amount of yeast is kept to a minimum because of its cost. For a dough composition of the kind specifically set forth above, yeast is generally added in amounts of from 0.5 to 6 parts by weight.

Leavening is achieved by the action of the yeast on residual fermentable carbohydrate in the product, for example those small quantities which may be present in a dough prepared with low-starch gluten flour. To increase the rate and amount of leavening, fermentable sugar may be formed in the compositions by the action of added diastatic enzymes. Alternatively, sugar may be added to the compositions to promote leavening. If sugar is added, the minimum amount necessary to produce the desired degree of rise, usually between 0.5 and 1.5 parts by weight, is employed in order to minimize the carbohydrate and calorie content of the final product. A high degree of utilization of the sugar can be assured by judicious choice of the relative amounts of yeast and sugar.

A dough suitable for the formation of uenleavened products is prepared by combining the following ingredients:

| | Parts by wt. |
|---|---|
| Low-starch gluten flour (e.g. "Vicrum" having a protein:starch ratio of about 5:1) | 50 |
| Cellulose crystallite aggregates (e.g. "Avicel") | 20–40 |
| Gum (e.g. karaya or pectin) | 1.5–5 |
| Water | 60–90 |

If desired, the dry ingredients can all be first combined to form a dry mix, adaptable to long storage, to which the water can be added when convenient to form the dough.

The same dough can be used for the production of leavened products by the addition thereto of about 3 parts by weight of yeast and minor amounts of yeast nutrients (e.g. 0.25 to 0.5 percent by weight of total solids). About 2 parts by weight of sugar may be added to accelerate leavening, or, preferably, fermentable sugar may be formed in the dough by diastatic action. For the production of bread and rolls it is particularly advantageous to replace a portion of the cellulose crystallite aggregates by bran from which substantially all assimilable carbohydrate has been removed. Palatable products excellently simulating whole wheat bread in color, flavor, and texture have been obtained using a mixture of equal parts by weight of bran and cellulose crystallites as the non-nutritive filler.

In all of the compositions, additional coloring and flavoring agents may be present in amounts to taste. Such agents include salt, onion, caraway, herbs such as dill and the like, minor amounts of residual yeast and sugar, and other natural artificial food coloring and flavoring agents including synthetic sweeteners and food dyes. Mold retardants such as the propionates conventionally added to bread doughs may also be employed in the present invention in amounts of from 0.05 to 0.2 percent by weight of total solids.

The vegetable protein supplied by gluten can be nutritionally upgraded by adding about 0.25 percent by weight of the amino acid lysine to the products, the percentage being by weight of the total protein content therein.

Leavened doughs like those described above are suitably prepared by combining the gluten flour and yeast together with a portion of the water to form a dough and permitting the dough to ferment and rise, for example in a fermentation room, whereby the carbohydrate content is reduced. The raised dough is then mixed with the other solids and remaining water and permitted to rise.

In an alternative preparation of either leavened or unleavened dough, the solid ingredients are first combined and then blended with water which is preferably warmed to about 125°–150° F. If the mixture is yeast-leavened, the dough is next divided into the shape of the bread, rolls, or other product desired and is proofed and baked. The optional use of a pan cover during baking helps to regulate the formation of the crust.

Unleavened dough products are suitably chilled to about 40° F. to decrease their stickiness and improve their workability. For the formation of spaghetti or other pasta products, or of breakfast foods, for example, the dough can be pulled into sheets and cut, or can be extruded.

For pasta products, the cut or extruded dough may then be dried and sold in the form conventional for spaghetti, macaroni, noodles, etc. The dry pasta products of the invention are cooked in boiling water, for example. Alternatively, the cut or extruded dough may be sold without prior drying, for example frozen in plastic bags or other containers resistant to the transmission of water vapor, and then cooked inside or outside of such containers.

Pasta products of particularly good texture and consistency on chewing are made from doughs containing about 15 percent by weight of assimilable carbohydrate (starch). These doughs are conveniently prepared from a flour component in which vital gluten flour is combined with a flour of higher starch content, preferably semolina. The non-nutritive edible filler and edible vegetable gum are critically present in these doughs, just as in the doughs of lesser starch content.

These preferred pasta doughs are prepared from a flour component comprising from about 15 to about 25 parts by weight of a vital gluten flour such as "Vicrum" and from about 35 to about 25 parts by weight of semolina (or a comparable flour. The flour component is combined with non-nutritive edible filler and edible gum in amounts previously disclosed. The filler is preferably present in an amount of 40–50 parts by weight per 50 parts of flour component. If the vital gluten content of the flour component drops below about 15 parts in 50, the pasta products produced therefrom fragment badly on boiling. At vital gluten contents greater than about 25 parts in 50, excellent structure is maintained. However, the products are perhaps subjectively less desirable since their texture does not imitate as well to the mouth, teeth, and tongue the texture of ordinary high-calorie pasta.

In these pasta doughs, about 3–6 parts by weight of edible gum are preferably combined with 50 parts of flour component. Lower gum contents lead to products which fragment on boiling, while higher gum contents tend to impart an undesirable slippery feel. The gum cannot be omitted or masses are obtained which cannot be extruded to form a pasta article.

A preferred dry mix for making pasta dough comprises 20 parts by weight of vital gluten flour such as "Vicrum," 30 parts of semolina, 50 parts of cellulosic filler such as "Avicel," and 5 parts of edible gum, such as karaya. The mix contains about 24–25 percent of available carbohydrate.

100 parts of the mix are suitably combined with about 80 parts of water to give a dough having a starch content of only about 13–14 percent. The dough is extruded to form pasta.

Since pasta products of this type are more difficult to rehydrate than ordinary products of high starch content, the novel pasta is preferably not dried after extrusion, but cooked in boiling water. Cooking adds from 100 to 120 parts of water per 180 parts of extruded dough, further reducing the available carbohydrate content to about 9–10 percent, corresponding to a calorie content in the cooked product of less than 1 calorie per gram, indeed of only about 0.5 calorie per gram.

The cooked pasta is conveniently marketed in cans or boilable plastic pouches, alone or with suitable sauces.

A better understanding of the present invention and of its many advantages will be had by referring to the following specific examples, given by way of illustration.

EXAMPLE 1

A low-starch low-calorie bread was prepared by suspending 0.3 gram of a heat-stable bacterial diastase commercially available under the tradename "Rhozyme H–39" in 10 ml. of water. 1.5 ml. of this suspension were added to 90 ml. of water warmed to about 60° C. and then combined with 100 grams of flour comprising (1) 60 grams of low-starch vital gluten flour having a protein content of about 71 percent by weight and a carbohydrate content of about 15 percent by weight and (2) 40 grams of a vital gluten flour having a protein content of about 39 percent by weight and a carbohydrate content of about 47 percent by weight. The resulting dough ball was kept at a temperature of 60° C. for 15 to 30 minutes.

Meanwhile a crumbly mass was prepared by combining 80 ml. of water with 50 grams of cellulose crystallite aggregates, 3 grams of yeast, 0.6 gram of yeast nutrients, 0.15 gram of lysine, 5 grams of gum karaya, 5 grams of caraway seed, 4 grams of salt, 0.15 gram of sodium-calcium propionate, and 20 drops of an artificial sweetener solution. This mass was then blended into the dough ball.

The dough was proofed for two hours and then oven-baked. The resulting bread had a starch content of 8.2 percent and contained about 1.2–1.3 calories per gram as baked.

EXAMPLE 2

A bread further reduced in caloric content was prepared as in Example 1 above except that 10 grams of wheat middlings (bran) from which assimilable carbohydrate has been removed were combined into the dough together with the 50 grams of cellulose crystallite aggregates, yeast, gum, etc.

EXAMPLE 3

A synthetic bread product was prepared by dry blending 40 grams of a commercial gluten flour having a protein content of about 71 percent and a carbohydrate content of about 15 percent, 10 grams of a commercial gluten flour having a protein content of about 39 percent and a carbohydrate content of about 47 percent, 20 grams of cellulose crystallite aggregates, and 3 grams of guar gum. The mixed ingredients were then added to 80 ml. of agitated water containing two grams of salt, five grams of yeast, and four grams of sugar. The dough was kneaded until fully developed, proofed, and then oven-baked at 425° F.

EXAMPLE 4

100 grams of a commercially available gluten flour having a protein content of about 71 percent and a carbohydrate content of about 15 percent were dry blended with 7.5 grams of guar gum, and 75 grams of wheat middlings (bran) from which assimilable carbohydrate had been removed by leaching with water. The resultant dry mixture was combined with 180 ml. of water containing 4 grams of salt, 5 grams of yeast, and 2 grams of sugar. The dough was kneaded until developed, then proofed and baked.

EXAMPLE 5

35 grams of a commercially available gluten flour having a protein content of about 71 percent and a carbohydrate content of about 15 percent and 15 grams of a second commercial gluten flour containing about 39 percent of protein and about 47 percent of carbohydrate were combined with 30 grams of cellulose crystallite aggregates, two grams of gum karaya (or pectin), two grams of salt, and 80 ml. of water. After thorough mixing, the resultant dough was extruded into preferred shapes e.g. as spaghetti, macaroni, and noodles. Portions of the shaped dough were then sealed into polyethylene bags to each of which an amount of water equal to the water content of the dough therein was added in the form of ice. The bag was then sealed and frozen.

The product was easily prepared for eating by placing the sealed bag in boiling water for ten minutes. All of the water added to the bag was absorbed to produce a cooked pasta product containing about 0.5–0.7 calories per gram.

EXAMPLE 6

A green pasta product was made following the recipe of Example 5 but substituting dried spinach powder for up to about ⅓ of the weight of cellulose crystallite aggregates.

Either of the pasta products of Examples 5 and 6 can be formed into a preferred shape and then dried in a drying oven at about 100°–120° F. to give products resembling conventional pasta in appearance. Products of the latter type are prepared for eating by boiling in water.

EXAMPLE 7

Cocktail snacks were prepared from a dough comprising 25 grams of a commercial gluten flour containing about 71 percent of protein and about 15 percent of carbohydrate, 25 grams of cellulose crystallite aggregates, 5 grams of pectin, 2.5 grams of salt, 1.5 grams of onion powder, 1.0 grams of dill, and 45 ml. of water. After thorough mixing, the dough was rolled into a thin sheet and cut. The pieces were baked uncovered in an oven at 400° F. for about three minutes until toasted.

EXAMPLE 8

A crumbly cereal product was prepared by combining 100 grams of commercially available gluten flour having a protein content of about 71 percent and a carbohydrate content of about 15 percent with 1.5 ml. of a 0.2 percent solution of a diastatic enzyme ("Rhozyme H–39") and 90 ml. of water to form a first component, I.

A second component, II, was prepared by combining 45 ml. of water, 4 grams of salt, 2 grams of yeast, and 20 drops of a synthetic sweetener solution.

A third component, III, was prepared by combining 20 grams of wheat middlings (bran) from which carbohydrate had been removed by leaching with water, 10 grams of cellulose crystalline aggregates, and 3.5 grams of karaya.

Component I was heated at 70° C. for 30 minutes, then boiled for 10 minutes and mixed with components II and III. The mixture was leavened by standing for two hours at 80° F. and then baked.

After baking, the product was shredded and toasted to form the final cereal product.

EXAMPLE 9

A synthetic bread was prepared by thoroughly combining 100 ml. of water with the following pre-mixed dry ingredients:

| | Grams |
|---|---|
| Gluten flour (protein content about 71 percent; carbohydrate content about 15 percent) | 100 |
| Cellulose crystallite aggregates | 60 |
| Gum karaya | 5 |
| Yeast | 5 |
| Salt | 9–10 |

The dough so prepared was proofed and baked at about 425° F. for one hour in a covered pan.

EXAMPLE 10

A low starch-content bread was prepared by saturating 100 grams of gluten flour having an initial protein content of about 71 percent and an initial carbohydrate content of about 15 percent with cold water. Starch was then washed from the resultant dough by kneading it under running water for one hour.

Sixty grams of cellulose crystallite aggregates, five grams of gum karaya, 70 ml. of water, 8 grams of salt, 2 ml. of a 3 percent aqueous solution of "Rhozyme H–39" diastatic enzyme, 3 grams of yeast, and 60 drops of a concentrated synthetic sweetener solution were mixed with the washed dough. The mixture was heated to 150° F. for one-half hour and set aside overnight to rise. The dough was then shaped into a loaf and baked for 45 minutes at 425° F.

The resultant loaf had a starch content of 1.59 percent.

EXAMPLE 11

A synthetic bread product was prepared by blending the following ingredients to form a dough:

| | Grams |
|---|---|
| Gluten flour (protein content about 71 percent; carbohydrate content about 15 percent) | 50.0 |
| Peanut shells (ground and sifted) | 25.0 |
| Gum karaya | 2.0 |
| Salt | 2.0 |
| Sugar | 4.0 |
| Yeast | 7.5 |

Water, 80.0 ml.

The dough was allowed to rise and then was baked for 45 minutes in a covered pan. (The cover was removed during the final 15-minutes of this baking period.) The loaf had a good external appearance and crust, and had a pleasant odor of peanuts.

EXAMPLE 12

100 grams of gluten flour having an approximate protein content of 71 percent and a carbohydrate content of about 15 percent were combined with 60 ml. of water to form a dough ball. The dough ball was repeatedly washed under cold water and then divided into small pieces with which the following ingredients were then combined:

| | Grams |
|---|---|
| Wood pulp ("Solka Floc" weed cellulose, Brown & Co.) | 50.0 |
| Gum karaya | 5.0 |
| Salt | 4.0 |
| "Rhozyme H–39" diastatic enzyme (300 mg./10 ml. of water) 1.5 ml. | |

After thorough blending with the dough pieces, the mixture was allowed to stand for 30 minutes at 60° C. The dough ball was then again divided and remixed with 7.5 grams of yeast and 20.0 ml. of water. This mixture was allowed to rise for two hours at 45°–50° C. and baked at 425° F. for one hour.

EXAMPLE 13

A pasta was prepared by dry blending 20 grams of vital gluten flour ("Vicrum"), 30 grams of semolina, 50 grams of cellulose crystal aggregates ("Avicel"), and 5 grams of karaya.

0.025 cc. of imitation black walnut flavor was added to 80 cc. of water and the aqueous mixture was then slowly added to the dry blended ingredients with agitation. The resulting combination was mixed and blended.

The resultant dough was extruded through the die of a worm-driven pasta machine and immediately boiled for 1½ to 2 minutes in boiling salted water.

The cooked pasta was then canned, or bagged and frozen, with or without the addition of sauce.

What is claimed is:

1. A dough convertible by heating into a calorie-poor foodstuff, said dough containing less than about 15 percent by weight of assimilable carbohydrate and consisting essentially of 50 parts by weight of gluten flour containing vital gluten, 10 to 50 parts by weight of a non-nutritive edible cellulosic filler, and 1 to 10 parts by weight of a vegetable gum, together with sufficient water to form a dough.

2. A dough as in claim 1 containing less than about 10 percent by weight of assimilable carbohydrate wherein said gluten flour has a protein:starch ratio of about 2:1.

3. A dough as in claim 1 wherein yeast is additionally present.

4. A calorie-poor leavened baked product poor in assimilable carbohydrate prepared by baking the dough of claim 3.

5. A dough as in claim 1 wherein diastatic enzymes are additionally present.

6. A dough as in claim 1 wherein said non-nutritive edible cellulosic filler comprises cellulose crystallite aggregates.

7. A dough as in claim 1 wherein said non-nutritive edible cellulosic filler comprises wheat middlings from which assimilable carbohydrate has been at least partially removed.

8. A dough as in claim 1 wherein said non-nutritive edible cellulosic filler comprises wood pulp.

9. A dough as in claim 1 wherein said non-nutritive edible cellulosic filler comprises ground peanut shells.

10. A calorie-poor unleavened baked product poor in assimilable carbohydrate prepared by baking the dough of claim 1.

11. A dough convertible by heating into a calorie-poor foodstuff, said dough containing less than about 15 percent by weight assimilable carbohydrate and consisting essentially of about 15 to about 25 parts by weight of gluten flour containing vital gluten and having a protein:starch ratio of at least 2:1, about 35 to about 25 parts by weight of flour other than said gluten flour, about 40 to about 50 parts by weight of a non-nutritive edible cellulosic filler, about 1 to 10 parts by weight of a vegetable gum, together with sufficient water to form a dough.

12. A dough as in claim 11 wherein said other flour is semolina flour.

13. A dough as in claim 11 wherein said non-nutritive edible cellulosic filler includes cellulose crystallite aggregates.

14. A calorie-poor uncooked pasta product poor in assimilable carbohydrate prepared by shaping and drying the dough of claim 11.

15. A dry mix adaptable to combination with a potable liquid to form a dough containing less than about 10 percent by weight of assimilable carbohydrate and convertible by heating into a calorie-poor foodstuff, said dry mix consisting essentially of 50 parts by weight of gluten flour containing vital gluten, 10 to 50 parts by weight of a non-nutritive edible cellulosic filler, and 1 to 10 parts by weight of a vegetable gum.

16. A dry mix as in claim 15 wherein said non-nutritive edible cellulosic filler comprises cellulose crystallite aggregates.

17. A cooked pasta product prepared by shaping and heating the dough of claim 1.

References Cited

UNITED STATES PATENTS

| | | | |
|---|---|---|---|
| 2,876,106 | 3/1959 | Jucaltis et al. | 99—90X |
| 3,023,104 | 2/1962 | Battista | 99—1 |
| 3,249,512 | 5/1966 | Bode | 99—90X |

FOREIGN PATENTS

| | | | |
|---|---|---|---|
| 155,466 | 3/1954 | Australia | 99—90 |

RAYMOND N. JONES, Primary Examiner

J. R. HOFFMAN, Assistant Examiner

U.S. Cl. X.R.

99—85, 86, 90, 92, 94